US011440821B2

United States Patent
Ito et al.

(10) Patent No.: US 11,440,821 B2
(45) Date of Patent: Sep. 13, 2022

(54) WATER-PURIFYING AGENT AND WATER PURIFICATION METHOD

(71) Applicant: Dexerials Corporation, Tokyo (JP)

(72) Inventors: Masahiko Ito, Tokyo (JP); Ryu Shimada, Tokyo (JP); Takanori Fujita, Tokyo (JP)

(73) Assignee: Dexerials Corporation, Tokyo (JP)

( * ) Notice: Subject to any disclaimer, the term of this patent is extended or adjusted under 35 U.S.C. 154(b) by 0 days.

(21) Appl. No.: 16/988,820

(22) Filed: Aug. 10, 2020

(65) Prior Publication Data

US 2020/0369539 A1   Nov. 26, 2020

Related U.S. Application Data

(62) Division of application No. 15/560,077, filed as application No. PCT/JP2016/058410 on Mar. 16, 2016, now abandoned.

(30) Foreign Application Priority Data

Mar. 30, 2015  (JP) ................................ 2015-069266

(51) Int. Cl.
| | | |
|---|---|---|
| C02F 1/52 | (2006.01) | |
| B01D 21/01 | (2006.01) | |
| B01J 20/24 | (2006.01) | |
| C02F 1/56 | (2006.01) | |
| B01J 20/28 | (2006.01) | |

(Continued)

(52) U.S. Cl.
CPC ............ *C02F 1/5263* (2013.01); *B01D 21/01* (2013.01); *B01J 20/24* (2013.01); *B01J 20/3014* (2013.01); *B01J 20/3028* (2013.01); *C02F 1/5227* (2013.01); *C02F 1/56* (2013.01); *B01J 20/28016* (2013.01); *B01J 20/3231* (2013.01); *C02F 2101/103* (2013.01); *C02F 2101/14* (2013.01); *C02F 2101/20* (2013.01); *C02F 2101/203* (2013.01); *C02F 2101/22* (2013.01)

(58) Field of Classification Search
None
See application file for complete search history.

(56) References Cited

U.S. PATENT DOCUMENTS

| 2003/0159987 A1 | 8/2003 | Jensen |
|---|---|---|
| 2005/0161407 A1 | 7/2005 | McPhillips |

(Continued)

FOREIGN PATENT DOCUMENTS

| CN | 102198407 | 9/2011 |
|---|---|---|
| CN | 102247814 | 11/2011 |

(Continued)

OTHER PUBLICATIONS

Machine translation of JPS522877A, pp. 1-2. (Year: 1977).*

(Continued)

*Primary Examiner* — Clare M Perrin
(74) *Attorney, Agent, or Firm* — Carmody Torrance Sandak & Hennessey LLP (57) ABSTRACT

Provided is a water-purifying agent formed of a granulated product including a mixture of a plant powder and a polymeric flocculant, wherein a surface of the granulated product includes a coated portion in which the plant powder is coated with the polymeric flocculant and a non-coated portion in which the plant powder is not coated with the polymeric flocculant.

11 Claims, 2 Drawing Sheets

200 μm (51) Int. Cl.
*B01J 20/30* (2006.01)
*C02F 101/10* (2006.01)
*C02F 101/14* (2006.01)
*C02F 101/20* (2006.01)
*C02F 101/22* (2006.01)
*B01J 20/32* (2006.01)

(56) References Cited

U.S. PATENT DOCUMENTS

| | | | |
|---|---|---|---|
| 2009/0272693 | A1 | 11/2009 | Mabille et al. |
| 2011/0094968 | A1 | 4/2011 | Spittle et al. |
| 2013/0299433 | A1* | 11/2013 | Inagaki ............... B01J 20/24 210/730 |

FOREIGN PATENT DOCUMENTS

| | | | |
|---|---|---|---|
| CN | 103508533 | | 1/2014 |
| GB | 1370446 | | 10/1974 |
| JP | 49083681 | | 8/1974 |
| JP | 52002877 | | 1/1977 |
| JP | S522877 | A * | 1/1977 |
| JP | 07308527 | | 11/1995 |
| JP | 09117776 | | 5/1997 |
| JP | 11114313 | | 4/1999 |
| JP | 11114314 | | 4/1999 |
| JP | 2004000923 | | 1/2004 |
| JP | 2011194384 | | 10/2011 |
| JP | 2011194385 | | 10/2011 |
| JP | 2013078717 | | 5/2013 |
| JP | 2014008428 | | 1/2014 |
| JP | 2014505588 | | 3/2014 |
| KR | 10-2012-21241 | A | 3/2012 |
| RU | 2241730 | | 12/2004 |
| RU | 2293069 | | 6/2005 |
| TW | 201139288 | | 11/2011 |
| TW | 201228946 | | 7/2012 |
| UA | 47749 | | 2/2010 |
| WO | 0107750 | | 2/2001 |
| WO | 2010131492 | | 11/2010 |
| WO | 2013/090569 | | 6/2013 |
| WO | WO-2013090569 | A2 * | 6/2013 ............... C02F 9/00 |

OTHER PUBLICATIONS

Chinese Office Action cited on 11/11 IDS, pp. 1-14, for partial translation of JPS522877A on pp. 4-5. (Year: 1977).*
European Patent Office, Extended Search Report issued in European Application No. 16772316.2, dated Oct. 1, 2018.
The Patent Office of the People's Republic of China, First Office Action in Chinese Application No. 201680018554.1, dated Jan. 18, 2019.
The Patent Office of the People's Republic of China, Second Office Action in Chinese Application No. 201680010554.1, dated Jul. 19, 2019.
Federal Service for Intellectual Property, Decision to Grant in Russian Application No. 2017134280/05 (060433), dated Apr. 26, 2019.
European Patent Office, Extended Search Report issued in European Application No. 16768268.1, dated Oct. 2, 2018.
The Patent Office of the People's Republic of China, First Office Action in Chinese Application No. 201680019448.5, dated Jan. 21, 2019.
Shimada, et al., News of Flowers from Standing Director, Atomi University Nosanfu [online], 2010.
General Directorate of Intellectual Property, Office Action issued in Indonesian Application No. P00201707443, dated Jul. 15, 2019.
The Patent Office of the People's Republic of China, Second Office Action issued in Chinese Application No. 201680019448.5, dated Jul. 19, 2019.
Taiwanese Patent Office, Office Action issued in Taiwanese Application No. 105108400, dated Aug. 12, 2019.
Taiwanese Patent Office, Office Action issued in Taiwanese Application No. 105108800, dated Aug. 23, 2019.
Taiwanese Patent Office, Office Action issued in Taiwanese Application No. 105106180, dated Jul. 12, 2019.
European Patent Office, European Official Communication issued in European Application No. 16768268.1, dated Oct. 29, 2019.
Indian Patent Office, Examination Report issued in Indian Application No. 201737036029, dated Nov. 29, 2019.
The Patent Office of the People's Republic of China, Chinese Notification of Reexamination issued for corresponding Chinese Patent Application No. 201680018554.1, dated Aug. 20, 2021.
The Patent Office of the People's Republic of China, Chinese Notification of Reexamination issued for corresponding Chinese Patent Application No. 201680019448.5, dated Oct. 28, 2021.
Reexamination Decision issued for corresponding Chinese application No. 201680018554.1, dated Dec. 24, 2021.
Notification of Reexamination dated Apr. 28, 2022 issued in connection with corresponding Chinese Application No. 201680016364.6.
Notification of Reason for Refusal dated Mar. 17, 2022 issued in connection with corresponding Korean Application No. 10-2017-7030636.
Reexamination Decision issued for corresponding Chinese application No. 201680019448.5 dated Jan. 21, 2022.
Notification of Reason for Refusal dated Mar. 21, 2022 issued in connection with corresponding Korean Application No. 10-2017-7030637.
Notification of Reason for Refusal dated May 16, 2022 issued in connection with corresponding Korean Application No. 10-2017-7029767.
Acha, B.A. et al., "Physical and Mechanical Characterization of Jute Fabric Composites", Journal of Applied Polymer Science, vol. 98, p. 639 to 650, 2005.

* cited by examiner

WATER-PURIFYING AGENT AND WATER PURIFICATION METHOD

TECHNICAL FIELD

The present invention relates to a plant-derived water-purifying agent used for purification of water such as industrial wastewater and a water purification method using the water-purifying agent.

BACKGROUND ART

In recent years, a large amount of waste liquids containing environmentally hazardous substances such as metal ions and fluorine ions as inorganic ions have been generated in the processes for producing various products in plants.

Meanwhile, regulations on effluence of such inorganic ions have been becoming gradually strict. In order to comply with the effluent control, an inorganic ion removing method that can effectively remove inorganic ions from wastewater including the inorganic ions and can be carried out as easily and inexpensively as possible is demanded.

Hitherto, as the method for removing impurity ions from, for example, wastewater from plants, for example, a flocculating precipitation method, an ion-exchange method, a method for adsorption to an adsorbent such as activated charcoal, an electrosorption method, and a magnetic adsorption method have been proposed.

For example, as the flocculating precipitation method, there has been proposed a method of performing a step of adding a base to wastewater in which heavy metal ions are dissolved, to make the wastewater basic, insolubilize at least part of the heavy metal ions, and form a suspended solid matter, a step of adding an inorganic flocculant to the wastewater to make the suspended solid matter set and settle, a step of adding a polymeric flocculant to the wastewater to turn the suspended solid matter to a macrofloc, and an adsorbing step of passing the wastewater through an adsorption layer containing a cation exchanger formed of a leafy vegetable such as mulukhiya and Japanese mustard spinach (see, e.g., PTL 1).

There has also been proposed a flocculating method of flocculating and separating particles in a suspension by means of mixed use or combined use of a flocculant containing at least any one of mulukhiya, a dried product of mulukhiya, and an extract of mulukhiya with a polymeric flocculant (see, e.g., PTL 2).

The more the amount of the wastewater to be purified, the more the amount of an unnecessary substance included in the wastewater, or the more the kinds of unnecessary substances included in the wastewater, the more necessary it is to build an automated system for feeding a purifying agent necessary for the wastewater purification treatments.

Device automation is an important issue for performing high-speed, stable purification treatments, and it is desired to provide a water-purifying agent suitable for being fed to an automated purification apparatus.

CITATION LIST

Patent Literature

PTL 1: Japanese Patent Application Laid-Open (JP-A) No. 2011-194385
PTL 2: JP-A No. 11-114313

SUMMARY OF INVENTION

Technical Problem

However, the method described in PTL 1 takes effort and time because the flocculating step using a flocculant and the adsorbing step using a cation exchanger are separate. The method described in PTL 2 takes time until inorganic ions are reduced to equal to or lower than the desired concentration. Neither of the methods is satisfactory in water purifying performance.

Furthermore, the methods described in these documents are not at all intended for automated devices for wastewater purification treatments. The purifying agents described in the documents are not suitable for being fed to automated system devices.

Hence, it has been desired to provide a water-purifying agent that is capable of reducing inorganic ions to equal to or lower than a desired concentration in a predetermined time, has an excellent water purifying performance, and can be suitably used in an automated system device.

The present invention aims for solving the various problems in the related art and achieving the object described below. That is, the present invention has an object to provide a water-purifying agent that has an excellent water purifying performance and can be suitably used in an automated wastewater purification apparatus.

Solution to Problem

Means for solving the above problems are as follows.
<1> A water-purifying agent, including:
 a granulated product including a mixture of a plant powder and a polymeric flocculant,
 wherein a surface of the granulated product includes a coated portion in which the plant powder is coated with the polymeric flocculant and a non-coated portion in which the plant powder is not coated with the polymeric flocculant.
<2> The water-purifying agent according to <1>,
 wherein a ratio of an area of the coated portion to a total of the area of the coated portion and an area of the non-coated portion is from 10% through 90%.
<3> The water-purifying agent according to <1> or <2>,
 wherein a ratio of an area of the coated portion to a total of the area of the coated portion and an area of the non-coated portion is from 30% through 70%.
<4> The water-purifying agent according to any one of <1> to <3>,
 wherein the plant powder is of any one of *Corchorus olitorius*, mulukhiya, Japanese mustard spinach, Japanese honewort, potherb mustard, and spinach.
<5> The water-purifying agent according to <4>,
 wherein the plant powder is of *Corchorus olitorius*.
<6> The water-purifying agent according to <4> or <5>,
 wherein the *Corchorus olitorius* is "intermediate jute No. 4" under 2013, which is an identification number in Institute of Bast Fiber Crops, Chinese Academy of Agricultural Sciences.
<7> The water-purifying agent according to any one of <1> to <6>,
 wherein a median diameter of the water-purifying agent is 150 micrometers or greater.
<8> The water-purifying agent according to any one of <1> to <7>,
 wherein the polymeric flocculant is a polyacrylamide.

<9> The water-purifying agent according to any one of <1> to <8>, wherein the water-purifying agent is produced by a producing method including a kneading step of mixing the plant powder and the polymeric flocculant and kneading the plant powder and the polymeric flocculant with addition of moisture, to obtain a kneaded product, a stretching/sheet forming step of shaping the kneaded product into a sheet shape by a stretching method, to obtain a sheet-shaped shaped product, a drying step of drying the sheet-shaped shaped product, to obtain a dried sheet, and a pulverizing step of pulverizing the dried sheet.

<10> A water purification method, including:

dissolving the water-purifying agent according to any one of <1> to <9> in water to obtain a dispersion liquid of the plant powder and the polymeric flocculant, and feeding the dispersion liquid to wastewater including an inorganic unnecessary substance to remove the inorganic unnecessary substance in the wastewater.

<11> The water purification method according to <10>, wherein the wastewater is wastewater including the inorganic unnecessary substance that contains at least any one of nickel, fluorine, iron, copper, zinc, chromium, arsenic, cadmium, tin, and lead.

<12> The water purification method according to <11>, including feeding the dispersion liquid to the wastewater after subjecting at least any one of inorganic ions selected from the group consisting of a nickel ion, a fluorine ion, an iron ion, a copper ion, a zinc ion, a chromium ion, an arsenic ion, a cadmium ion, a tin ion, and a lead ion contained in the inorganic unnecessary substance to an insolubilizing treatment.

Advantageous Effects of Invention

The present invention can solve the various problems in the related art, achieve the object described above, and provide a water-purifying agent that has an excellent water purifying performance and can be suitably used in an automated wastewater purification apparatus.

DESCRIPTION OF EMBODIMENTS (Water-Purifying Agent)

A water-purifying agent of the present invention is formed of a granulated product including a mixture of a plant powder and a polymeric flocculant.

The surface of the granulated product includes a coated portion in which the plant powder is coated with the polymeric flocculant and a non-coated portion in which the plant powder is not coated with the polymeric flocculant.

The water-purifying agent of the present invention satisfying the requirement described above is a water-purifying agent that has an excellent water purifying performance and can be suitably used in an automated wastewater purification apparatus.

The present inventors have earnestly studied a water-purifying agent including a plant powder in order to provide a water-purifying agent having an excellent water purifying performance. As a result, it has been found that a granulated product obtained by kneading a plant powder and a polymeric flocculant has an excellent water purifying performance if the surface of the granulated product includes a coated portion in which the plant powder present on the surface of the granulated product is coated with the polymeric flocculant and a non-coated portion in which the plant powder present on the surface of the granulated product is not coated with the polymeric flocculant.

The reason is uncertain but considered as follows.

The target of the present invention is industrial wastewater, e.g., industrial wastewater including an inorganic unnecessary substance such as nickel, fluorine, iron, copper, zinc, chromium, arsenic, cadmium, tin, and lead. For removal of the inorganic unnecessary substance from the wastewater (also described as purification of water), the present invention insolubilizes inorganic ions such as nickel ion, fluorine ion, and iron ion contained in the inorganic unnecessary substance, to form a suspended solid matter (also referred to as microfloc in the present invention), and flocculates and settles the microfloc, to separate the solid from the liquid. In such purification of water, use of a granulated product formed of a plant powder and a polymeric flocculant is considered to:

(i) promote formation of the microfloc of the inorganic ions included in the wastewater by the polymeric flocculant;

(ii) increase an effect of adsorbing the inorganic ions included in the wastewater by the plant powder; and (iii) increase an effect of adsorbing the microfloc by pores present in the plant powder.

Hence, it can be assumed that if the void (porous) portions of the fiber of the plant material are not at all coated with the polymeric flocculant (if the coated portion is not formed), the plant particles rapidly absorb water and settle, failing to exhibit the adsorbing effect described above, whereas that if the porous portions are completely coated with the polymeric flocculant (if the non-coated portion is not formed), the plant powder particles having the cation exchange function cannot sufficiently have contact with the wastewater, failing to exhibit the effects of (ii) and (iii) described above.

Accordingly, it is considered that the granulated product defined in the present invention and including both of the coated portion and the non-coated portion on the surface can exhibit an excellent water purifying performance.

The granulated product defined in the present invention and including the coated portion and the non-coated portion on the surface can be produced by a producing method described below.

The granulated product defined in the present invention, produced by the producing method described below, and satisfying the requirement described above exhibits an excellent settling resistance, and exhibits favorable values as viscosity and bulk specific gravity (see the results of Examples below). The fact that the granulated product exhibits these physical properties is also considered a factor for exhibiting an excellent water purifying performance.

The granulated product defined in the present invention exhibits a favorable value as fluidity index as presented in Examples below, has an excellent fluidity, and can be suitably used in an automated purification apparatus.

A specific constitution of the water-purifying agent will be described below.

<Plant>

The plant is not particularly limited so long as the plant is a plant that can flocculate and separate unnecessary substances (e.g., nickel, copper, and fluorine) included in wastewater. Examples of the plant include *Corchorus olitorius*, mulukhiya, Japanese mustard spinach, Japanese honewort, potherb mustard, and spinach. It is preferable to use powders of these plants, because powders of these plants have a high cation exchange function and have pores that can adsorb a microfloc included in the wastewater including the inorganic ions.

Any part of the plant such as leaf, stalk, and root may be used.

Among the plants, *Corchorus olitorius* and mulukhiya are preferable, and *Corchorus olitorius*, which exhibited favorable results in Examples below, is more preferable.

Among *Corchorus olitorius*, "intermediate jute No. 4" under 2013, which is an identification number in Institute of Bast Fiber Crops, Chinese Academy of Agricultural Sciences, is particularly preferable.

"Intermediate jute No. 4" has the following characteristics.

Kind of agricultural product: jute

Source of breed: a product obtained by breeding a hybridized F1 generation between Hunan jute No. 3 and 0-4(1), with Hunan jute No. 3.

Characteristics: Intermediate jute No. 4 is a typical type of *Corchorus olitorius* jute that has green cylindrical stalks, scattered acicular leaves, green petioles, a small angle from the main stalk, lateral buds and stipules, green calyces, and a cylindrical shape of a long fruit. A 5-locule species is a late-maturing breed.

<Polymeric Flocculant>

The polymeric flocculant is not particularly limited so long as the polymeric flocculant exhibits an effect of removing the inorganic unnecessary substance included in the wastewater, like the plant described above. Examples of the polymeric flocculant include polyacrylamide (PAM), a salt obtained by partially hydrolyzing polyacrylamide, polyamine, sodium alginate, sodium polyacrylate, and CMC sodium salt. Among these polymeric flocculants, polyacrylamide is preferable for use. As the polyacrylamide, for example, commercially available products FLOPAN AN 905, FLOPAN AN 926, and FLOPAN AN 956 (available from SNF Japan Co., Ltd.) can be used.

<Granulated Product of Mixture of Plant Powder and Polymeric Flocculant>

The mixing ratio between the plant powder and the polymeric flocculant is in the range of from 10:90 through 90:10 on a mass ratio basis.

The granulated product exhibits the following characteristics.

<<Surface Condition>>

The surface of the granulated product includes a coated portion in which the plant powder is coated with the polymeric flocculant and a non-coated portion in which the plant powder is not coated with the polymeric flocculant.

The surface of the granulated product has a porous form in which pores are present and many holes are opened due to the fiber structure of the plant powder.

The coated portion is formed by the polymeric flocculant intruding into the pores of the fiber of the plant material and the pores present on the surface of the granulated product being coated with the polymeric flocculant.

States of the coated portion and the non-coated portion will be described with reference to FIG. 1 to FIG. 3.

Figure 2:
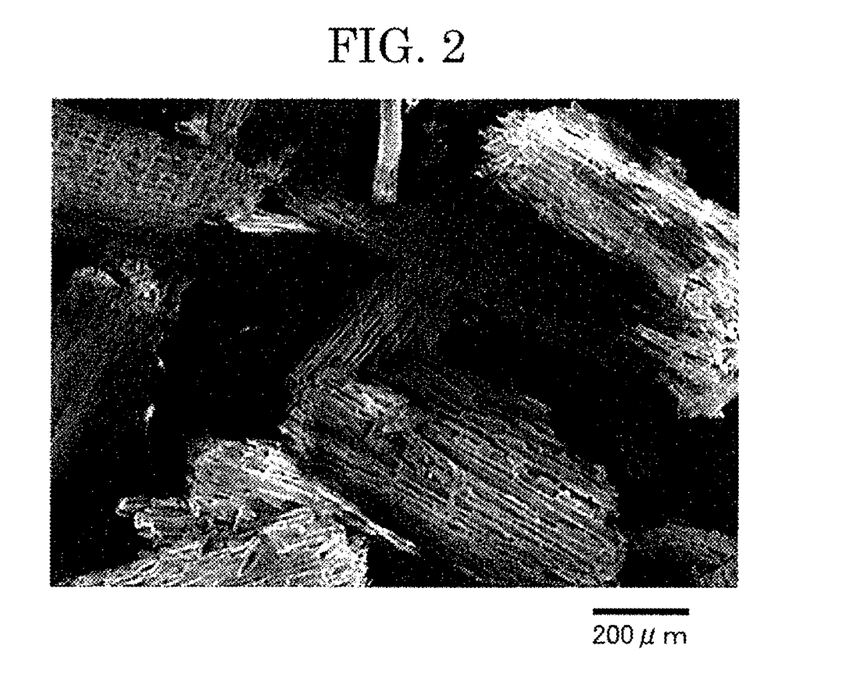
FIG. 2 is a scanning electron microscopic image (SEM image) illustrating an example of a surface of a granulated product.

FIG. 2 is a SEM image of a surface of a granulated product on which pores are not coated with the polymeric flocculant, illustrating a state that the pores are not coated with the polymeric flocculant, and the coated portion is not formed, i.e., the area of the coated portion accounts for 0% of the surface area of the granulated product.

Figure 3:
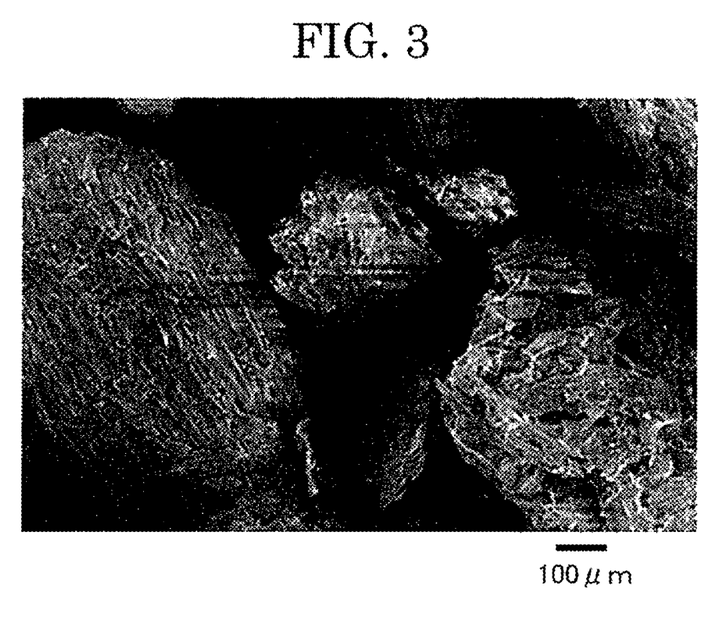
FIG. 3 is a scanning electron microscopic image (SEM image) illustrating an example of a surface of a granulated product.

FIG. 3 is a SEM image of a surface of a granulated product on which pores are completely coated with the polymeric flocculant, illustrating a state that the non-coated portion is not formed, i.e., the area of the coated portion accounts for 100% of the surface area of the granulated product.

Figure 1:
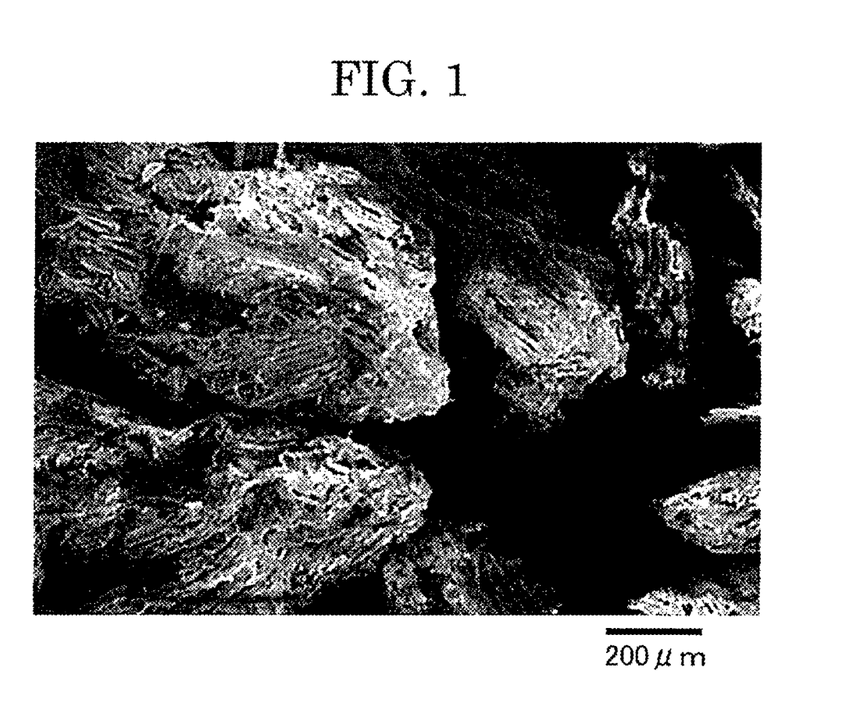
FIG. 1 is a scanning electron microscopic image (SEM image) illustrating an example of a surface of a granulated product.

As compared, FIG. 1 is a SEM image illustrating an example of the granulated product defined in the present invention. FIG. 1 illustrates a state that the coated portion and the non-coated portion are present in a mixed state on the surface of the granulated product. FIG. 1 illustrates a state that the area of the coated portion accounts for 50% of the surface area of the granulated product.

In order for the granulated product to sufficiently exert the effects of (i) to (iii) described above, it is important that at least part of the plant powder present on the surface of the granulated product be not coated with the polymeric flocculant to form a non-coated portion. In the present invention, the area of the coated portion accounts for less than 100%, preferably equal to or less than 90% of the surface area of the granulated product. Meanwhile, in order for the granulated product to sufficiently exert the effects of (i) to (iii) described above, it is also important that at least part of the plant powder present on the surface of the granulated product be coated with the polymeric flocculant to form a coated portion. In the present invention, the area of the coated portion accounts for greater than 0%, preferably equal to or greater than 10% of the surface area of the granulated product.

In the present invention, the area of the coated portion is measured in the manner described below, and the ratio of the area of the coated portion in the surface area is calculated according to the formula (1) below.

$$\text{Area of coated portion}/(\text{area of coated portion}+\text{area of non-coated portion}) \qquad (1)$$

In the present invention, the ratio of the area of the coated portion to the total of the area of the coated portion and the area of the non-coated portion is preferably from 10% through 90% and more preferably from 30% through 70%.

In order to form a coated portion and a non-coated portion on the surface of the granulated product, it is preferable to produce the granulated product by the producing method described below. Particularly, when the producing method is employed, it is possible to adjust the ratio between the coated portion and the non-coated portion. The producing method will be described below.

The areas of the coated portion and the non-coated portion can be obtained by a method described below based on SEM images.

[Method for Measuring Ratio of Coated Portion in Surface Area]

As illustrated in FIG. 1, the portions at which a porous structure conforming to the oblique fibrous structure can be observed are non-coated portions that are not coated with the polymeric flocculant, and the portions at which a porous structure conforming to an oblique fibrous structure cannot be observed are coated portions that are coated with the polymeric flocculant. Hence, the SEM image is observed to classify the portions as the corresponding portions, and measure the areas of the respective portions. As represented by the formula (1) above, the ratio of the area of the coated portions to the total of the area of the coated portions and the area of the non-coated portions is calculated as the ratio of the coated portions in the surface area.

The measurement is performed on a region having an image brightness that allows discrimination of the fibrous structure of the plant described above. For example, in a case where it is impossible to recognize the surface structure because of being displayed darkly for such a reason as that the surface of the granulated product is dented, or in a case where it is difficult to recognize the surface structure because the image is dark, as is observed also in FIG. 1 to FIG. 3 from place to place, such regions are excluded from the measurement.

<<Median Diameter>>

The median diameter of the granulated product defined in the present invention is preferably 150 micrometers or greater and more preferably 200 micrometers or greater but 900 micrometers or less.

When the median diameter is less than 150 micrometers, quantitativity of the granulated product by a feeder is poor because the granulated product has a poor fluidity.

When the median diameter is 900 micrometers or less, there is no risk of clogging ducts provided in, for example, a pulverizer or an automatic feeder. Therefore, the granulated product can be favorably used in an automatic purification apparatus.

The median diameter (also referred to as d50) is a diameter of a particle plotted at 50% of all particles when the granulated product is plotted by the size of particle diameter (i.e., a particle diameter that makes particles having larger diameters and particles having smaller diameters equal in quantity). In the present invention, a particle diameter refers to volume particle diameter.

The median diameter can be measured with a commercially available measuring instrument such as MASTERSIZER 2000 (available from Malvern Instruments Ltd.).

<<Fluidity Index>>

A Carr's fluidity index of the water-purifying agent of the present invention obtained by measuring 3 items of the water-purifying agent, which are an angle of repose, a degree of compression, and a spatula angle, is preferably 45 or greater and more preferably 52.5 or greater.

Here, an angle of repose, a degree of compression, and a spatula angle refer to an angle of repose, a degree of compression, and a spatula angle raised as measurement items for Carr's fluidity index (R. L. Carr. 'Evaluating Flow Properties of Solids' Chemical Engineering, Jan. 18, 1965).

The angle of repose, the degree of compression, and the spatula angle can be measured with, for example, various types of commercially available powder physical property measurement devices. Specifically, for example, these properties can be measured with POWDER TESTER PT-N TYPE (available from Hosokawa Micron Corporation) according to methods described below.

For obtaining a fluidity index based on the obtained angle of repose, degree of compression, and spatula angle, it is possible to use a standard generally known as Carr's fluidity index.

In the present invention, the Carr's fluidity index table generated by Hosokawa Micron Corporation based on the aforementioned Chemical Engineering, Jan. 18. (1965) on page 166 and page 167 under authorization of R. L. Carr and McGraw-Hill Inc. and made known to the public by Hosokawa Micron Corporation is used.

Table 1 below presents a table of fluidity indices with respective to 3 items related with the present invention, which are an angle of repose, a degree of compression, and a spatula angle, among evaluation items of Carr's fluidity index. Based on Table 1, an index for an angle of repose, an index for a degree of compression, and an index for a spatula angle corresponding to measured values of the angle of repose, the degree of compression, and the spatula angle respectively are obtained, and these index values are totaled. In the present invention, the total value is used as the fluidity index of the water-purifying agent.

TABLE 1

| Fluidity index | Angle of repose | | Degree of compression | | Spatula angle | |
|---|---|---|---|---|---|---|
| | Degree | Index | % | Index | Degree | Index |
| 67.5 to 75 | <26 | 25 | <6 | 25 | <26 | 25 |
| | 26 to 29 | 24 | 6 to 9 | 23 | 26 to 30 | 24 |
| | 30 | 22.5 | 10 | 22.5 | 31 | 22.5 |
| 60 to 67 | 31 | 22 | 11 | 22 | 32 | 22 |
| | 32 to 34 | 21 | 12 to 14 | 21 | 33 to 37 | 21 |
| | 35 | 20 | 15 | 20 | 38 | 20 |
| 52.5 to 59.5 | 36 | 19.5 | 16 | 19.5 | 39 | 19.5 |
| | 37 to 39 | 18 | 17 to 19 | 18 | 40 to 44 | 18 |
| | 40 | 17.5 | 20 | 17.5 | 45 | 17.5 |
| 45 to 52 | 41 | 17 | 21 | 17 | 46 | 17 |
| | 42 to 44 | 16 | 22 to 24 | 16 | 47 to 59 | 16 |
| | 45 | 15 | 25 | 15 | 60 | 15 |
| 30 to 44.5 | 46 | 14.5 | 26 | 14.5 | 61 | 14.5 |
| | 47 to 54 | 12 | 27 to 30 | 12 | 62 to 74 | 12 |
| | 55 | 10 | 31 | 10 | 75 | 10 |
| 15 to 29.5 | 56 | 9.5 | 32 | 9.5 | 76 | 9.5 |
| | 57 to 64 | 7 | 33 to 36 | 7 | 77 to 89 | 7 |
| | 65 | 5 | 37 | 5 | 90 | 5 |
| 0 to 13.5 (14.5) | 66 | 4.5 | 38 | 4.5 | 91 | 4.5 |
| | 67 to 89 | 2 | 39 to 45 | 2 | 92 to 99 | 2 |
| | 90 | 0 | >45 | 0 | >99 | 0 |

The angle of repose, the degree of compression, and the spatula angle can be obtained in the manners described below.

[Measurement of Angle of Repose (°)]

The angle of repose (°) can be measured with POWDER TESTER PT-N TYPE (available from Hosokawa Micron Corporation) according to an injection method described below.

A measurement sample is let to fall onto a circular receptacle table through a funnel and form a mountain-shaped layer. An angle formed between a slope of the mountain and a horizontal plane is measured.

[Measurement of Degree of Compression (°)]

Da (compressed apparent specific gravity) and Db (loose apparent specific gravity) for the degree of compression can be measured with POWDER TESTER PT-N TYPE (available from Hosokawa Micron Corporation).

A dedicated cap is attached on top of a 100 cc stainless steel cup. A sample (from 150 cc through 200 cc) is loaded into the cup. The specific gravity of the sample after the sample is vibrated by being let to fall from a height of 2 cm repeatedly 180 times is measured as Da.

The sample (100 cc) is calmly loaded into the 100 cc stainless steel cup, and the specific gravity of the sample at the time is measured as Db.

The Da and Db values are assigned into the formula (2) below.

$$\text{Degree of compression (\%)} = \{(Da-Db)/Da\} \times 100 \qquad (2)$$

Da (compressed apparent specific gravity): a specific gravity of powder, grains, or both of powder and grains measured after the powder, the grains, or both of the powder and the grains loaded in a container having a predetermined capacity is/are vibrated by being let to fall from a height of 2 cm repeatedly 180 times Db (loose apparent specific gravity): a specific gravity of powder, grains, or both of powder and grains measured when the powder, the grains, or both of the powder and the grains is/are calmly loaded into a container having a predetermined capacity

[Measurement of Spatula Angle (°)]

The spatula angle (°) can be measured with POWDER TESTER PT-N TYPE (available from Hosokawa Micron Corporation).

A sample is deposited on a rectangular spatula put horizontally in a manner to conceal the spatula. A cross-sectional angle (A) of a mountain formed when the spatula is slowly lifted up vertically, and a cross-sectional angle (B) of a mountain formed after the mountain of the powder is collapsed by application of a certain impact are measured. These values are assigned into the formula (3) below to calculate the spatula angle (°).

$$\text{Spatula angle (°)} = \{(A+B)/2\} \qquad (3)$$

The water-purifying agent of the present invention produced by the producing method described below exhibits a favorable result as the fluidity index as presented in Examples below.

<<Bulk Specific Gravity>>

The water-purifying agent of the present invention produced by the producing method described below exhibits a favorable value as bulk specific gravity, and has a small variation in the bulk specific gravity value.

The bulk specific gravity of the water-purifying agent is 0.3 g/cm$^3$ or greater but 0.8 g/cm$^3$ or less.

The bulk specific gravity can be measured with POWDER TESTER PT-N TYPE (available from Hosokawa Micron Corporation).

A sample (100 cc) is calmly poured into a 100 cc stainless steel cup, and the specific gravity of the sample at the time is measured as the bulk specific gravity.

Variation of the bulk specific gravity (variation being a ratio of a difference between a maximum and a minimum of the bulk specific gravity to the minimum of the bulk specific gravity) of the water-purifying agent is preferably 4.5% or less.

The variation of the bulk specific gravity can be obtained in the manner described below.

The water-purifying agent, which is the measurement sample, is poured into a bag having a certain size (e.g., a 700 mm×500 mm plastic bag), and the opening of the bag is heat-sealed. Here, the amount of the water-purifying agent to be poured into the bag is considered in a manner to secure a space in the bag enough for the water-purifying agent to move freely in a subsequent vibrating operation. Next, the water-purifying agent put in the bag is vibrated up and down so as not to break the granulated product. Subsequently, the sample is taken out from the bag from 5 positions including the top and bottom portions of the bag, and the bulk specific gravity of each is measured.

The maximum and the minimum of the bulk specific gravity are recorded, and the variation is obtained according to the calculation of the formula (4) below based on the maximum and the minimum.

$$\text{(Difference between maximum and minimum of bulk specific gravity/minimum of bulk specific gravity)} \times 100 \qquad (4)$$

<Method for Producing Granulated Product>

The granulated product defined in the present invention is produced by a producing method including a kneading step of mixing the plant powder and the polymeric flocculant and kneading the plant powder and the polymeric flocculant with addition of moisture, to obtain a kneaded product, a stretching/sheet forming step of shaping the kneaded product into a sheet shape by a stretching method, to obtain a sheet-shaped shaped product, a drying step of drying the sheet-shaped shaped product, to obtain a dried sheet, and a pulverizing step of pulverizing the dried sheet.

Further, a classifying step of classifying the granulated product by sieving may be provided after the pulverizing step.

The present inventors have experimentally confirmed that an excessively strong shear force (shear) applied to the kneaded product during granulation caused the polymeric flocculant to intrude into the porous portions of the fiber of the plant material to have the plant powder on the surface coated with the polymeric flocculant.

Hence, in order to control the shear to be applied to the kneaded product, the granulated product was produced by a granulation method based on the stretching/sheet forming step. As a result, it was found possible to produce a granulated product on which a coated portion and a non-coated portion were present. Furthermore, it is also possible to control the ratio of the coated portion in the surface area by the granulation method based on the stretching/sheet forming step.

In the stretching/sheet forming step, the kneaded product is gradually stretched by a roller, and a sheet-shaped shaped product having a predetermined thickness is formed stepwise. According to this method, the shaped product can be produced with the viscosity of the kneaded product maintained favorably. This is considered to effectively act in the production of the granulated product defined in the present invention.

In the kneading step, a dry plant is coarsely pulverized and then finely pulverized, to obtain a plant powder having a desired size. Subsequently, the obtained plant powder and the polymeric flocculate are mixed and kneaded with addition of moisture.

Here, as the adding amount of water, it is preferable to add water having a mass of about, for example, 3 times as large as the total mass of the mixed plant powder and polymeric flocculant.

Kneading is performed with a mixer, for example, a vertical mixer such as a planetary mixer, with the rotation number and time set within predetermined ranges.

The rotation number and time of kneading by the mixer can be appropriately set in consideration of the kind of the plant and conditions such as the mixing ratio between the plant powder and the polymeric flocculant. For example, the rotation number is preferably from 20 rpm through 150 rpm, and the time is preferably from 5 minutes through 25 minutes.

In the stretching/sheet forming step, the obtained kneaded product may be stretched by a stretching method using a roller until the thickness becomes from 2 mm through 30 mm, preferably about 10 mm, to be shaped into a sheet shape.

It is possible to control the coated state of the plant powder on the surface of the granulated product, by controlling the shear to be applied to the kneaded product. For example, in the kneading step, it is possible to control the coated state of the plant powder on the surface of the granulated product, by varying the conditions such as the mixing ratio between the plant powder and the polymer, the amount of water to be added, the mixing speed (the rotation number of the mixer during kneading), and the mixing time (the kneading time by the mixer) in the kneading step, or by varying the stretching conditions in the stretching/sheet forming step.

In the drying step, the obtained shaped product may be dried with a multistage hot air dryer at a temperature of from 80 degrees C. through 150 degrees C. for from 2 hours through 12 hours.

In the pulverizing step, pulverization may be performed with a pulverizer such as a jet type ultrafine grinder until the median diameter falls within a range of from 150 micrometers through 900 micrometers.

In the classifying step, the pulverized powder may be subjected to a classifier, e.g., a vibration sieve machine or a cartridge-type sieve machine, to classify the granulated product of which particle diameter is within a predetermined range, so that the median diameter may be within a range of from 150 micrometers through 900 micrometers.

(Water Purification Method)

A water purification method of the present invention dissolves the water-purifying agent of the present invention described above in water to obtain a dispersion liquid of the plant powder and the polymeric flocculant, and feeds the dispersion liquid to wastewater to remove an inorganic unnecessary substance included in the wastewater.

Examples of the inorganic unnecessary substance include an inorganic unnecessary substance that contains at least any one of nickel, fluorine, iron, copper, zinc, chromium, arsenic, cadmium, tin, and lead.

The water purification method of the present invention will be specifically described.

Inorganic ions such as nickel ion, fluorine ion, and iron ion contained in the inorganic unnecessary substance included in the wastewater are subjected to an insolubilizing treatment, to form a microfloc. The dispersion liquid prepared as an aqueous solution of from 0.1% through 0.2% is fed to the wastewater. The microfloc is flocculated and settled, and a precipitate separated by settling is removed. In this way, the wastewater is purified.

In the insolubilizing treatment, for example, a base is added to the wastewater to make the wastewater basic and insolubilize the inorganic ions. Further, after the base is added, it is possible to add a polymeric flocculant alone. In this case, addition of a polymeric flocculant alone before addition of the water-purifying agent of the present invention can increase the floc size of the microfloc in the wastewater,

EXAMPLES

The present invention will be described below by way of Examples. The present invention should not be construed as being limited to these Examples.

Example 1

As wastewater used for experiment, an aqueous solution (800 g) including nickel ion (50 mg/L) was prepared by dissolving nickel sulfate hexahydrate in pure water (virtual wastewater).

Next, caustic soda was supplied to the wastewater to adjust pH to 10, and the wastewater was stirred to insolubilize nickel. A nickel ion concentration in a supernatant liquid of the wastewater was 2 mg/L.

<Water-Purifying Agent>

Next, "shrunk spinach produced in Maebashi of Gunma Prefecture" was used as the plant, and polyacrylamide (PAM) was used as the polymeric flocculant. A granulated product 1 was obtained by a producing method described below, and the granulated product 1 was used as a water-purifying agent 1.

<<Method for Producing Water-Purifying Agent>>

Water was added to the plant powder and the polymeric flocculant in a mass that was 3 times as large as the mass of a solid content, which was the total of the plant powder and the polymeric flocculant, to obtain a kneaded product (plant powder+polymeric flocculant+water=30 kg). The kneaded product was put in a planetary mixer (available from Aicohsha Manufacturing Co., Ltd., MIXER ACM-110, with a capacity of 110 L) and kneaded with a shear applied under conditions including a rotation number of 150 rpm and a mixing time of 20 minutes.

Using a press machine (available from Komatsu Industries Corp., a 45 t press machine), the obtained kneaded product was stretched with a roller to produce a sheet-shaped shaped product having a thickness of about 10 mm.

The shaped product was dried with a multistage hot air dryer (available from Shichiyo Co., Ltd., a rack oven) at 120 degrees C. for 3 hours and further at 150 degrees C. for 2 hours.

Next, the dried sheet was pulverized with a jet-type ultrafine grinder (available from Masuko Sangyo Co., Ltd., CEREN MILLER) such that the median diameter would be 400 micrometers.

The median diameter was measured with MASTERSIZER 2000 (available from Malvern Instruments Ltd.).

The pulverized powder was subjected to a classifier (a vibration sieve machine available from Dalton Corporation) to remove (cut) particles less than 200 micrometers and greater than 900 micrometers by sieving, in order to use only particles having a particle diameter in the range of from 200 micrometers through 900 micrometers.

In this way, the granulated product 1 was obtained and used as the water-purifying agent 1.

<Characteristic Evaluation>

The area of the coated portion of the granulated product 1 was measured by the measuring method described above. As a result, 50% of the surface area of the granulated product was the coated portion.

Next, the water-purifying agent 1 was added to the wastewater in an amount of 7 mg/L relative to a solid content, and the wastewater was stirred. As the method for measuring the "solid content", the solid content can be obtained by back calculation from a slurry concentration in the wastewater measured with a moisture meter.

The wastewater to which the water-purifying agent 1 was added was moved to a settling tank and then left to stand still. The condition of the wastewater was visually observed at every 1 hour.

The time at which the wastewater was obviously confirmed to be separated into 2 layers, namely a supernatant liquid and a precipitate was measured as a settling time.

The supernatant liquid was picked for ion concentration measurement with LAMBDA (Λ) 9000 (available from Kyoritsu Chemical-Check Lab., Corp.).

The result was evaluated according to the criteria described below as water purifying performance.

[Evaluation Criteria for Water Purifying Performance]

A: Less than 1.0 mg/L (equal to or less than the detection limit)

B: 1.0 mg/L or greater but less than 1.5 mg/L

C: 1.5 mg/L or greater but less than 2.0 mg/L
D: 2.0 mg/L or greater

The evaluation result of Example 1 is presented in Table 2-1. In Table 2-1, the plant powder 1 represents "shrunk spinach produced in Maebashi of Gunma Prefecture" and PAM represents a polyacrylamide (the same applies in Table 2-2 to Table 2-4).

Example 2

A granulated product 2 was produced in the same manner as in Example 1, except that unlike in Example 1, *Corchorus olitorius* (produced in Guangzhou of China) was used as the plant, and the rotation number of the mixer and the time in the kneading step were changed to 80 rpm and 15 minutes.

Using a water-purifying agent 2 formed of the granulated product 2, the characteristic of the water-purifying agent was evaluated in the same manner as in Example 1. The evaluation result of Example 2 is presented in Table 2-1. In Table 2-1, the plant powder 2 represents "*Corchorus olitorius* (produced in Guangzhou of China)".

Example 3

A granulated product 3 was produced in the same manner as in Example 2, except that unlike in Example 2, *Corchorus olitorius*, which was "intermediate jute No. 4" under 2013, which was an identification number in Institute of Bast Fiber Crops, Chinese Academy of Agricultural Sciences was used as the plant.

Using a water-purifying agent 3 formed of the granulated product 3, the characteristic of the water-purifying agent was evaluated in the same manner as in Example 1. The evaluation result of Example 3 is presented in Table 2-1. In Table 2-1, the plant powder 3 represents "intermediate jute No. 4".

Example 4

A granulated product 4 was produced in the same manner as in Example 3, except that unlike in Example 3, the rotation number of the mixer and the time in the kneading step were changed to 150 rpm and 5 minutes.

Using a water-purifying agent 4 formed of the granulated product 4, the characteristic of the water-purifying agent was evaluated in the same manner as in Example 1. The evaluation result of Example 4 is presented in Table 2-1.

Example 5

A granulated product 5 was produced in the same manner as in Example 3, except that unlike in Example 3, the rotation number of the mixer and the time in the kneading step were changed to 100 rpm and 10 minutes.

Using a water-purifying agent 5 formed of the granulated product 5, the characteristic of the water-purifying agent was evaluated in the same manner as in Example 1. The evaluation result of Example 5 is presented in Table 2-1.

Example 6

A granulated product 6 was produced in the same manner as in Example 3, except that unlike in Example 3, the rotation number of the mixer and the time in the kneading step were changed to 50 rpm and 20 minutes.

Using a water-purifying agent 6 formed of the granulated product 6, the characteristic of the water-purifying agent was evaluated in the same manner as in Example 1. The evaluation result of Example 6 is presented in Table 2-2.

Example 7

A granulated product 7 was produced in the same manner as in Example 3, except that unlike in Example 3, the rotation number of the mixer and the time in the kneading step were changed to 20 rpm and 25 minutes.

Using a water-purifying agent 7 formed of the granulated product 7, the characteristic of the water-purifying agent was evaluated in the same manner as in Example 1. The evaluation result of Example 7 is presented in Table 2-2.

Example 8

A granulated product 8 was produced in the same manner as in Example 3, except that unlike in Example 3, the classifying step was not performed.

Using a water-purifying agent 8 formed of the granulated product 8, the characteristic of the water-purifying agent was evaluated in the same manner as in Example 1. The evaluation result of Example 8 is presented in Table 2-2.

Example 9

A granulated product 9 was produced in the same manner as in Example 3, except that unlike in Example 3, a polyamine was used as the polymeric flocculant.

Using a water-purifying agent 9 formed of the granulated product 9, the characteristic of the water-purifying agent was evaluated in the same manner as in Example 1. The evaluation result of Example 9 is presented in Table 2-2.

Example 10

As wastewater used for experiment, an aqueous solution (800 g) including fluorine ion (2,500 mg/L) was prepared by dissolving potassium fluoride in pure water (virtual wastewater).

Next, calcium chloride (8.6 mg/L) was added to the wastewater, and the wastewater was stirred while adding sodium hydroxide to adjust pH to from 7.5 through 9.0, to insolubilize fluorine. By this operation, the fluorine aqueous solution was separated into a supernatant liquid including a microfloc and a precipitate.

At the time, the ion concentration in the supernatant liquid of the wastewater was 10 mg/L.

Using the water-purifying agent 3 formed of the granulated product 3, the characteristic of the water-purifying agent was evaluated in the same manner as in Example 3 except that the wastewater described above was used. The evaluation result of Example 10 is presented in Table 2-2.

Example 11

As wastewater used for experiment, an aqueous solution (800 g) including iron ion (200 mg/L) was prepared by dissolving ferric chloride hexahydrate in pure water (virtual wastewater).

Next, the wastewater was stirred while adding sodium hydroxide to adjust pH to from 6.5 through 9.0, to insolubilize iron.

At the time, the ion concentration in the supernatant liquid of the wastewater was 2 mg/L.

Using the water-purifying agent 3 formed of the granulated product 3, the characteristic of the water-purifying agent was evaluated in the same manner as in Example 3 except that the wastewater described above was used. The evaluation result of Example 11 is presented in Table 2-3.

Example 12

As wastewater used for experiment, an aqueous solution (800 g) including copper ion (100 mg/L) was prepared by dissolving copper sulfate pentahydrate in pure water (virtual wastewater).

Next, the wastewater was stirred while adding sodium hydroxide to adjust pH to from 7.0 through 8.0, to insolubilize copper.

At the time, the ion concentration in the supernatant liquid of the wastewater was 2 mg/L.

Using the water-purifying agent 3 formed of the granulated product 3, the characteristic of the water-purifying agent was evaluated in the same manner as in Example 3 except that the wastewater described above was used. The evaluation result of Example 12 is presented in Table 2-3.

Example 13

As wastewater used for experiment, an aqueous solution (800 g) including zinc ion (100 mg/L) was prepared by dissolving zinc nitrate hexahydrate in pure water (virtual wastewater).

Next, the wastewater was stirred while adding sodium hydroxide to adjust pH to from 9.0 through 9.5, to insolubilize zinc.

At the time, the ion concentration in the supernatant liquid of the wastewater was 5 mg/L.

Using the water-purifying agent 3 formed of the granulated product 3, the characteristic of the water-purifying agent was evaluated in the same manner as in Example 3 except that the wastewater described above was used. The evaluation result of Example 13 is presented in Table 2-3.

Example 14

As wastewater used for experiment, an aqueous solution (800 g) including chromium ion (100 mg/L) was prepared by dissolving potassium dichromate in pure water (virtual wastewater).

Next, the wastewater was stirred while adding sodium hydroxide to adjust pH to from 6.0 through 7.5, to insolubilize chromium.

At the time, the ion concentration in the supernatant liquid of the wastewater was 5 mg/L.

Using the water-purifying agent 3 formed of the granulated product 3, the characteristic of the water-purifying agent was evaluated in the same manner as in Example 3 except that the wastewater described above was used. The evaluation result of Example 14 is presented in Table 2-3.

Example 15

As wastewater used for experiment, an aqueous solution (800 g) including arsenic ion (10 mg/L) was prepared by dissolving diarsenic trioxide in pure water (virtual wastewater).

Next, ferric chloride (65 mg/L) and calcium chloride (354 mg/L) were added to the wastewater, and the wastewater was stirred while adding sodium hydroxide to adjust pH to from 8.0 through 9.5, to insolubilize arsenic.

At the time, the ion concentration in the supernatant liquid of the wastewater was 0.05 mg/L.

Using the water-purifying agent 3 formed of the granulated product 3, the characteristic of the water-purifying agent was evaluated in the same manner as in Example 3 except that the wastewater described above was used.

However, in Example 15, after the settling time was measured in the same manner as in Example 3, the supernatant liquid was picked and concentrated with an evaporator until the volume became 1/100, and then the ion concentration in the supernatant liquid was measured. As for arsenic ion, an ion concentration that would be judged as a favorable result and would be evaluated as grade A was 0.01 mg/L or less. The evaluation result of Example 15 is presented in Table 2-3.

Example 16

A granulated product 16 was produced in the same manner as in Example 3, except that unlike in Example 3, the median diameter in the dried sheet pulverization was changed to 150 micrometers.

Using a water-purifying agent 16 formed of the granulated product 16, the characteristic of the water-purifying agent was evaluated in the same manner as in Example 1. The evaluation result of Example 16 is presented in Table 2-3.

Example 17

A granulated product 17 was produced in the same manner as in Example 3, except that unlike in Example 3, the median diameter in the dried sheet pulverization was changed to 100 micrometers.

Using a water-purifying agent 17 formed of the granulated product 17, the characteristic of the water-purifying agent was evaluated in the same manner as in Example 1. The evaluation result of Example 17 is presented in Table 2-3.

Comparative Example 1

An experiment was conducted in the same manner as in Example 1, except that unlike in Example 1, a granulated product was not used and a polymeric flocculant was only used.

Using a comparative water-purifying agent 1 of Comparative Example 1, the characteristic of the water-purifying agent was evaluated in the same manner as in Example 1. The evaluation result of Comparative Example 1 is presented in Table 2-4.

Comparative Example 2

An experiment was conducted in the same manner as in Example 1, except that unlike in Example 1, a granulated product was not used, and a plant powder and a polymeric flocculate were used alone respectively.

Using a comparative water-purifying agent 2 of Comparative Example 2, the characteristic of the water-purifying agent was evaluated in the same manner as in Example 1. The evaluation result of Comparative Example 2 is presented in Table 2-4.

Comparative Example 3

A comparative granulated product 3 of Comparative Example 3 was produced in the same manner as in Example 3, except that unlike in Example 3, the rotation number of the mixer and the time in the kneading step were changed to 20 rpm and 30 minutes.

Using a comparative water-purifying agent 3 formed of the comparative granulated product 3, the characteristic of the water-purifying agent was evaluated in the same manner as in Example 1. The evaluation result of Comparative Example 3 is presented in Table 2-4.

TABLE 2-1

| Item | Ex. 1 | Ex. 2 | Ex. 3 | Ex. 4 | Ex. 5 |
|---|---|---|---|---|---|
| Plant powder | 1 | 2 | 3 | 3 | 3 |
| Polymeric flocculant | PAM | PAM | PAM | PAM | PAM |
| Area (%) of coated portion | 50 | 50 | 50 | 10 | 30 |
| Target ion | Ni | Ni | Ni | Ni | Ni |
| Median diameter (micrometer) | 400 | 400 | 400 | 400 | 400 |
| Settling time (hour) | 96 | 96 | 96 | 4 | 78 |
| Water purifying performance (96 hours later) | C | B | A | C | B |

TABLE 2-2

| Item | Ex. 6 | Ex. 7 | Ex. 8 | Ex. 9 | Ex. 10 |
|---|---|---|---|---|---|
| Plant powder | 3 | 3 | 3 | 3 | 3 |
| Polymeric flocculant | PAM | PAM | PAM | Polyamine | PAM |
| Area (%) of coated portion | 70 | 90 | 50 | 50 | 50 |
| Target ion | Ni | Ni | Ni | Ni | F |
| Median diameter (micrometer) | 400 | 400 | 400 | 400 | 400 |
| Settling time (hour) | 92 | 24 | 96 | 96 | 96 |
| Water purifying performance (96 hours later) | B | C | C | B | A |

TABLE 2-3

| Item | Ex. 11 | Ex. 12 | Ex. 13 | Ex. 14 | Ex. 15 | Ex. 16 | Ex. 17 |
|---|---|---|---|---|---|---|---|
| Plant powder | 3 | 3 | 3 | 3 | 3 | 3 | 3 |
| Polymeric flocculant | PAM | PAM | PAM | PAM | PAM | PAM | PAM |
| Area (%) of coated portion | 50 | 50 | 50 | 50 | 50 | 50 | 50 |
| Target ion | Fe | Cu | Zn | Cr | As | Ni | Ni |
| Median diameter (micrometer) | 400 | 400 | 400 | 400 | 400 | 150 | 100 |
| Settling time (hour) | 96 | 96 | 96 | 96 | 96 | 100 | 100 |
| Water purifying performance (96 hours later) | A | A | A | A | A | B | C |

TABLE 2-4

| Item | Comp. Ex. 1 | Comp. Ex. 2 | Comp. Ex. 3 |
|---|---|---|---|
| Plant powder | — | 3 | 3 |
| Polymeric flocculant | PAM | PAM | PAM |
| Area (%) of coated portion | — | 0 | 100 |
| Target ion | Ni | Ni | Ni |
| Median diameter (micrometer) | 400 | 400 | 400 |
| Settling time (hour) | — | 1 | 100 |
| Water purifying performance (96 hours later) | D | D | D |

Example 18

The angle of repose, degree of compression, and spatula angle of the granulated products 1 to 9 obtained in Examples 1 to 9 were measured by the methods described above, to calculate the fluidity index based on Table 1 presented above.

Fluidity was evaluated according to the criteria described below. As a result, all of the granulated products 1 to 9 obtained in Examples 1 to 9 exhibited a good result of A.

A: From 52.5 through 75
B: From 45 through 52
C: From 0 through 44.5

Example 19

The granulated product 3 obtained in Example 3 exhibited the physical properties presented in Table 3 below. These properties are considered effective properties that will lead to a good result when the granulated product is used as a water-purifying agent. The reason why a water-purifying agent exhibiting such good physical properties was obtained is considered largely attributable to the production by the granulation method based on the stretching/sheet forming step.

TABLE 3

| | Granulated product 3 |
|---|---|
| Settling resistance | 96 hours |
| Solubility viscosity (mPa · S) | 250 |
| Bulk specific gravity (g/cm$^3$) | From 0.33 through 0.39 |

In Table 3, the settling resistance (hour) refers to the settling time described in 1 above. The bulk specific gravity was measured by the method described above. The solution viscosity (mPa·S) was measured with a B-type viscometer.

From the results of Examples 1 to 19, it was confirmed that the water-purifying agent of the present invention was a water-purifying agent that was able to lower an inorganic ion concentration to equal to or lower than a desired concentration in a short time, and was excellent in water purifying performance. Furthermore, the water-purifying agent of the present invention had a good fluidity and did not clog an automatic feeder and a quantitative machine. It was confirmed that the water-purifying agent of the present invention was a water-purifying agent that could be suitably used in an automated system device.

The invention claimed is:

1. A method of producing a water-purifying agent, the water-purifying agent comprising a granulated product that comprises a mixture of a plant powder and a polymeric flocculant, the method comprising:
    mixing the plant powder and the polymeric flocculant and kneading the plant powder and the polymeric flocculant with addition of moisture using a mixer, to obtain a kneaded product;
    shaping the kneaded product into a sheet shape by a stretching method using a roller, to obtain a sheet-shaped product;
    drying the sheet-shaped product, to obtain a dried sheet; and
    pulverizing the dried sheet to obtain the granulated product.

2. The method according to claim 1, wherein the plant powder further comprises any one of mulukhiya, Japanese mustard spinach, Japanese honewort, potherb mustard, and spinach.

3. The method according to claim 1, wherein a median diameter of the water-purifying agent is 150 micrometers or greater.

4. The method according to claim 1, further comprising the step of subjecting the pulverized powder to a classifier to remove particles particle less than 200 micrometers and greater than 900 micrometers.

5. The method according to claim 1, wherein the plant powder is of *Corchorus olitorius* and the polymeric flocculant is a polyacrylamide.

6. The method according to claim 1, wherein the plant powder and the polymeric flocculant are kneaded for a time period of 5 minutes to 25 minutes.

7. The method according to claim 1, wherein a surface of the granulated product comprises a coated portion in which the plant powder is coated with the polymeric flocculant and a non-coated portion in which the plant powder is not coated with the polymeric flocculant;
    wherein a ratio of an area of the coated portion to a total of the area of the coated portion and an area of the non-coated portion is from 10% through 90%.

8. The method according to claim 7,
    wherein a ratio of an area of the coated portion to a total of the area of the coated portion and an area of the non-coated portion is from 30% through 70%.

9. A water purification method, comprising:
    preparing a water-purifying agent, wherein the water-purifying agent comprises a granulated product, wherein the water purifying agent is prepared by the steps of:
    a) mixing the plant powder and the polymeric flocculant and kneading the plant powder and the polymeric flocculant with addition of moisture using a mixer to obtain a kneaded product:
    b) shaping the kneaded product into a sheet shape by a stretching method using a roller to obtain a sheet-shaped product;
    c) drying the sheet-shaped product to obtain a dried sheet; and
    d) pulverizing the dried sheet to obtain the granulated product; and
    feeding a dispersion liquid of the water-purifying agent which contains the granulated product to wastewater including an inorganic unnecessary substance to remove the inorganic unnecessary substance in the wastewater,
    wherein the wastewater is wastewater including the inorganic unnecessary substance that contains at least any one of nickel, fluorine, iron, copper, zinc, chromium, arsenic, cadmium, tin, and lead.

10. The method according to claim 9, further comprising the step of:
    subjecting at least any one of inorganic ions selected from the group consisting of a nickel ion, a fluorine ion, an iron ion, a copper ion, a zinc ion, a chromium ion, an arsenic ion, a cadmium ion, a tin ion, and a lead ion contained in the inorganic unnecessary substance to an insolubilizing treatment,
    wherein the step of feeding the dispersion liquid to the wastewater is done after the step of subjecting the at least any one of inorganic ions to the insolubilizing treatment.

11. The method according to claim 9, wherein the plant powder and the polymeric flocculant are kneaded for a time period of 5 minutes to 25 minutes.

\* \* \* \* \*